United States Patent
Kwon

(10) Patent No.: US 6,652,416 B2
(45) Date of Patent: Nov. 25, 2003

(54) METHOD FOR CONTROLLING SHIFTS OF AUTOMATIC TRANSMISSION IN A VEHICLE

(75) Inventor: Jun-Eui Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 45 days.

(21) Appl. No.: 09/987,166

(22) Filed: Nov. 13, 2001

(65) Prior Publication Data

US 2002/0082135 A1 Jun. 27, 2002

(30) Foreign Application Priority Data

Dec. 22, 2000 (KR) ........................................ 2000-80347

(51) Int. Cl.$^7$ ............................................. B60K 41/24
(52) U.S. Cl. ............................. 477/94; 477/92; 192/220
(58) Field of Search ............................... 477/92, 94, 96, 477/114, 115, 116, 117, 125, 126; 182/220, 221

(56) References Cited

U.S. PATENT DOCUMENTS

| | | | | |
|---|---|---|---|---|
| 5,046,178 A | * | 9/1991 | Hibner et al. | 701/60 |
| 5,216,606 A | * | 6/1993 | Lentz et al. | 701/66 |
| 5,795,262 A | * | 8/1998 | Robinson | 477/92 |
| 5,833,572 A | * | 11/1998 | Leising et al. | 477/113 |
| 6,325,742 B1 | * | 12/2001 | Lee | 477/116 |
| 6,358,184 B1 | * | 3/2002 | Steinmetz et al. | 477/143 |
| 6,464,617 B1 | * | 10/2002 | Lee | 477/154 |

\* cited by examiner

Primary Examiner—Charles A. Marmor
Assistant Examiner—Dennis Abdelnour
(74) Attorney, Agent, or Firm—Birch, Stewart, Kolasch & Birch, LLP

(57) ABSTRACT

A method for controlling shifts of an auto vehicle transmission is disclosed to determine a forward running shifting process and then perform forward running operations if a range switch of the shift lever is made according to a backward running vehicle driver's intention to run forwards, after the driver considers brake pedal manipulation, the engine idle and vehicle's backward running speed at the time of a R→D range switch of the shift lever, thereby preventing the changing shift shock and reduction in strength that may be caused by wear or loss of friction elements, the method including the steps of: discriminating whether a R→D range switch signal has been input while the vehicle is running backwards; detecting the vehicle's running state if the R→D range switch signal has been input; discriminating whether the first speed shifting conditions are satisfied when the detected running states of the vehicle have been determined as follows: a brake switch is turned off, and the running speed is greater than 0 Kph; and performing the first shifting process if all the first speed shifting conditions have been fully satisfied.

13 Claims, 4 Drawing Sheets

METHOD FOR CONTROLLING SHIFTS OF AUTOMATIC TRANSMISSION IN A VEHICLE

BACKGROUND OF THE INVENTION

1. Field of the Invention

The present invention relates to a method for controlling shifts of an auto vehicle transmission and more particularly to a method for controlling shifts of an auto vehicle transmission which reduces a shifting shock generated at the time of a R→D range switch of the shift lever to run the vehicle forwards while it is running backwards.

2. Brief Description of the Related Art

In general, an auto transmission of a vehicle has a transmission control unit (hereinafter referred to as TCU) to automatically control a transmission rate according to the running speed and load of a vehicle.

At this time, the TCU controls the revolution number of an output terminal of a planetary gear apparatus by controlling a plurality of clutches and a brake installed at a gear train to an operational or non-operational state.

In controlling the output terminal, the TCU outputs a transmission rate controlling duty control signal, which shifts an auto transmission of a vehicle without a shock according to predetermined program processing steps when signals of various sensors to be variably output according to the running state of a vehicle to a solenoid valve which controls the oil pressure of a plurality of clutches and a brake installed at the gear drain, thereby controlling the duty of the solenoid valve and turning on or off.

First of all, in FIG. 1, C1, C2, C3, C4 and C5 respectively designate rear clutch (R/C), front clutch (F/C), low reverse brake (L/R-B), end clutch (E/C) and kick down servo (K/D).

Also, reference numerals 31, 32, 33, 34 and 35 respectively designate oil pressure control solenoid valve-A (PCSV-A), oil pressure control solenoid valve-B (PCSV-B), shift control solenoid valve-A (SCSV-A), shift control solenoid valve-B (SCSV-B) and shift control solenoid valve-C (SCSV-C).

Furthermore, reference numerals 40, 41, 42, 50, 51, 52, 53 and 54 respectively designate manual valve (M/V), pressure control valve-A (PCV-A), pressure control valve-B (PCV-B), shift control valve (SCV), rear clutch exhaust valve (R/C Ex-v), 2-3 and 3-4 shift valve (2-3 & 3-4 S/V), control shift valve (CSV) and fail safe valve (FSV).

In the auto transmission thus constructed of the prior art, when a driver wants to change the shift lever from the backward running 'R' range to the forward running 'D' range while the vehicle is running backwards at a low speed, the front clutch C2 and low reverse brake C3 function as combination elements to perform the backward running.

When a driver wants to change the shift lever to the forward running 'D' range, the front clutch C2 and low reverse brake C3 are released, and the rear clutch C1 and kick down servo C5 function as combination elements to perform the forward running. At this time, a kick down band is firstly fastened with the supply of line pressure to the combined side of the kick down servo C5, and, then, the line pressure of the rear clutch C1 is gradually raised to complete the control of a shift to the second running speed of the vehicle.

However, there is a problem in the prior art in that severe rolling and shift shock occur by an instantly stopping vehicle as one way clutch (OWC) is turned to its reverse direction when the rear clutch is suddenly fastened to the kick down band of the kick down servo C5.

SUMMARY OF THE INVENTION

It is an object of the present invention to solve the aforementioned problems and provide a method for controlling shifts of an auto vehicle transmission to perform forward running after a forward running shift is determined in consideration of operational states such as a driver's manipulation of a brake pedal, engine idle and backward running speed at the time of a R→D range switch of the shift lever according to a backward driving driver's intention to run forwards.

In order to accomplish the aforementioned object of the present invention, there is provided a method for controlling shifts of an auto vehicle transmission, the method comprising the steps of:

discriminating whether a R→D range switch signal has been input while the vehicle is running backwards;

detecting the vehicle's running state if the R→D range switch signal has been input;

discriminating whether the first speed shifting conditions are satisfied when the detected running states of the vehicle have been determined as follows: a brake switch is turned off, and the running speed is greater than 0 Kph; and performing the first shifting process if all the first speed shifting conditions have been fully satisfied.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
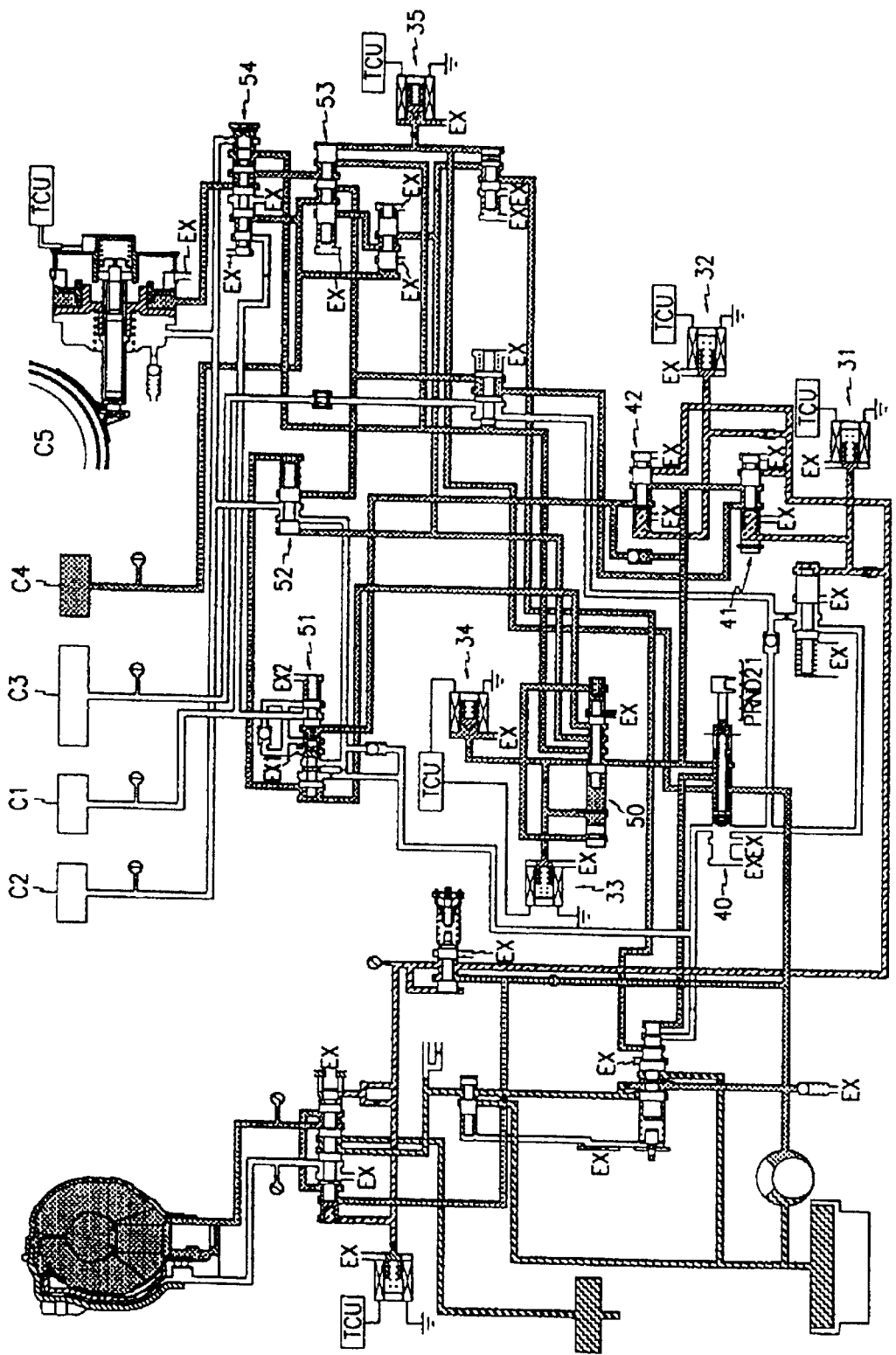
FIG. 1 is an oil pressure circuit drawing of an auto vehicle transmission.
Figure 2:
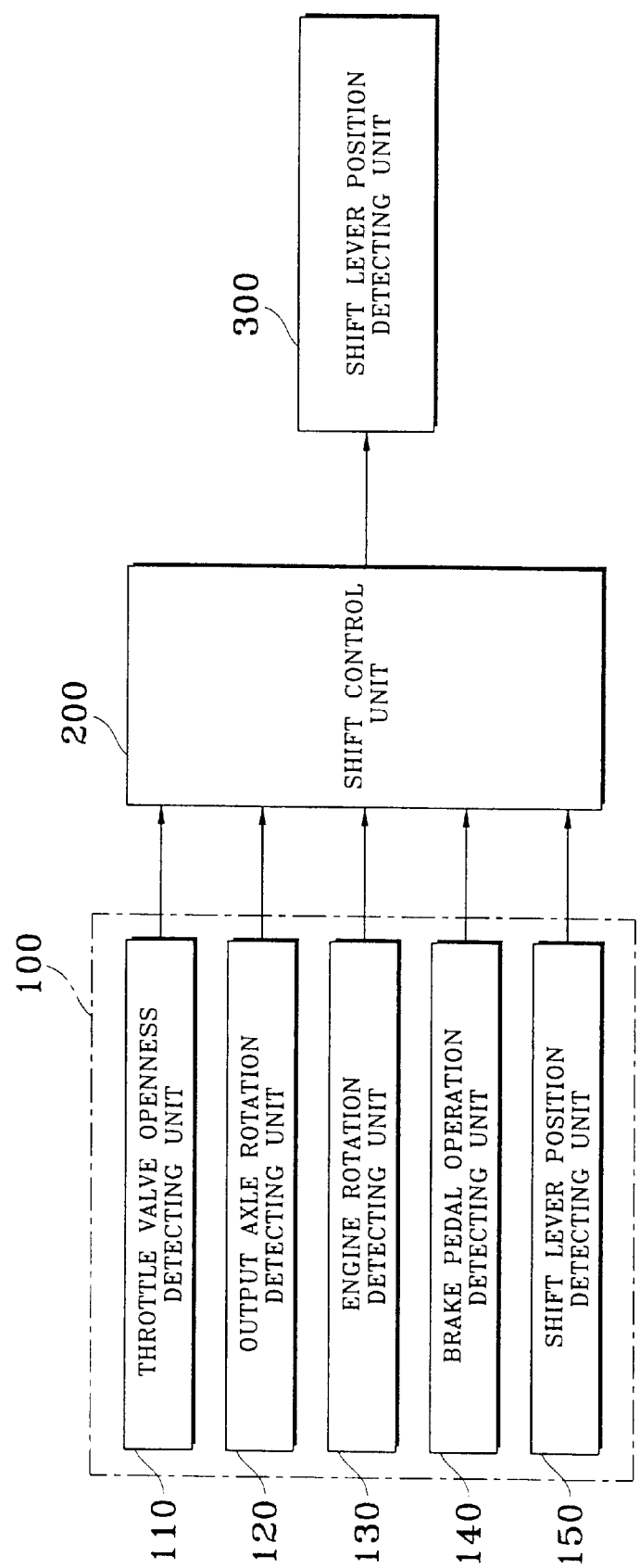
FIG. 2 is a block diagram for illustrating the structure of a shift control apparatus of an auto vehicle transmission in accordance with the present invention.

As shown in FIG. 2, a shift control apparatus of an auto vehicle transmission in accordance with the present invention comprises: a vehicle running state detecting unit 100 for detecting a vehicle's running state; a shift control unit 200 for determining a shift according to shift control conditions at the time of switching a shift lever and outputting a predetermined shift controlling duty signal if the shift lever is switched from backward running to forward running with an input of vehicle's running states such as the detected shift mode, openness of throttle valve, number of output axle rotations, number of engine rotations, state of manipulated brake pedal and position of the shift lever and if the low speed backward running state is checked and confirmed; and a driving unit 300 for performing shift operations by supplying or stopping a relevant friction element, the oil pressure discharged and supplied out of an oil pump by controlling a duty with a predetermined shift controlling duty signal to be output from the shift control unit 200.

At this time, the vehicle running state detecting unit 100 includes: a throttle valve openness detecting unit 110 for detecting the openness of the throttle valve communicating with the state of an accelerating pedal manipulated by a driver; an output axle rotation detecting unit 120 for detecting the output axle rotations of an output axle of an auto transmission with a signal corresponding to a vehicle's running speed; an engine rotation detecting unit 130 for detecting the rotations of an engine of a running vehicle; a brake pedal operation detecting unit 140 for detecting the manipulated state of a brake pedal; and a shift lever position detecting unit 150 for detecting the position of a shift lever variably changing according to a driver's manipulation.

Figure 3:
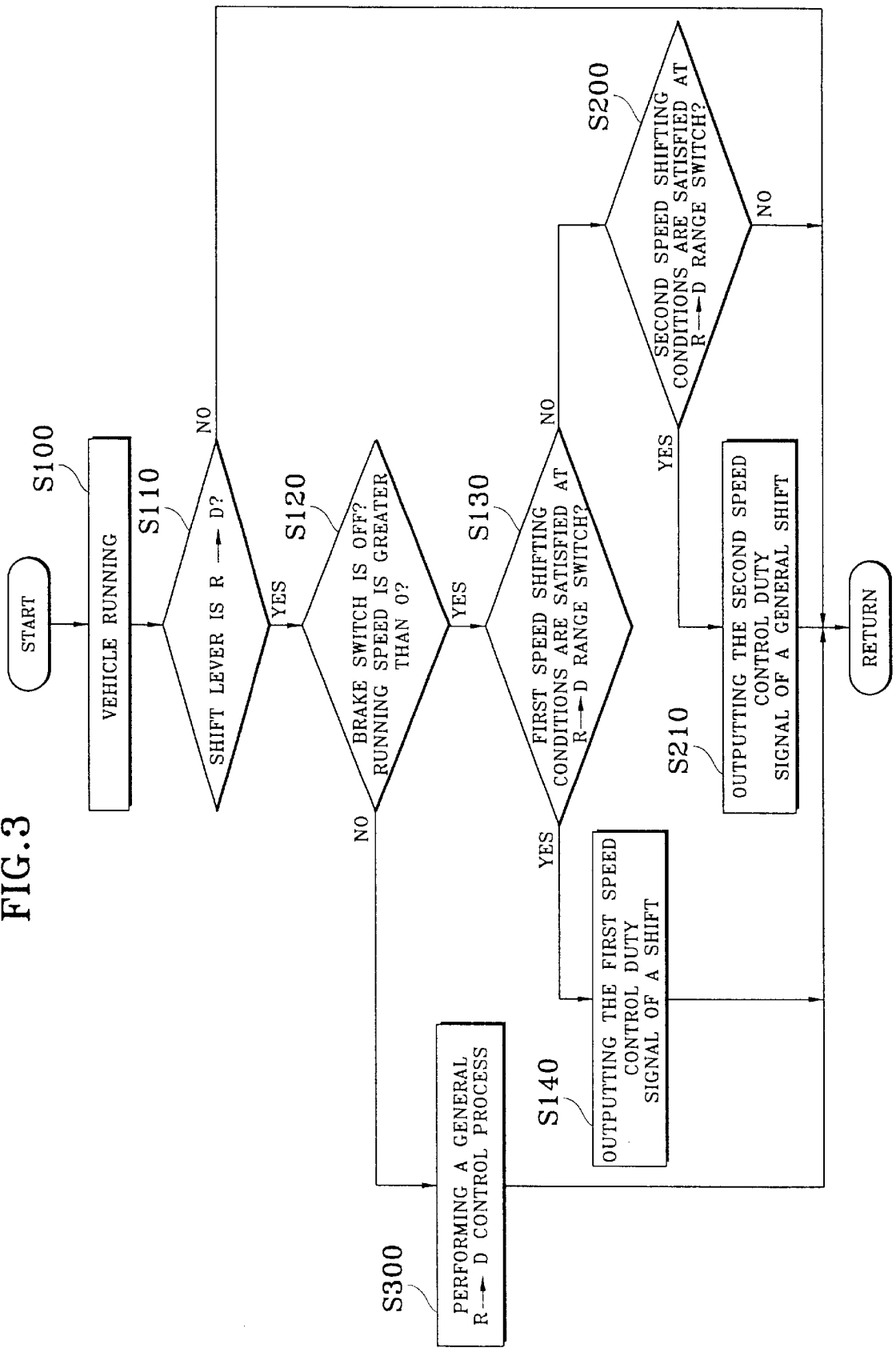
FIG. 3 is a flow chart for illustrating a sequence of controlling shifts of an auto vehicle transmission in accordance with the present invention.

Now, a method for controlling shifts of an auto vehicle transmission thus constructed will be described in detail with reference to FIGS. 3 and 4.

In a backward running vehicle, the shift controlling unit 200 discriminates whether the shift lever is manipulated to switch from backward running range 'R' to forward running range 'D' (S100, S110).

At the step of S110, if it is determined that the shift lever has been switched from backward running range 'R' to forward running range 'D', the shift controlling unit 200 determines the rotations of an output axle (No) corresponding to the manipulated state of the brake pedal and vehicle's running speed at the time of the a R→D range switch of the shift lever (S120).

If the brake pedal is turned off and if the number of output axle rotations is greater than 0 (rpm), the shift controlling unit 200 discriminates whether the first speed shifting conditions have been satisfied at the time of a R→D range switch of the shift lever (S130).

At this time, when the number of output axle rotations (No) is smaller than the first setup value (50 rpm) at the time of a R→D range switch of the shift lever, the number of turbine rotations (Nt) is used for determining that all the first speed shifting conditions have been satisfied.

In other words, the first speed shifting conditions should be satisfied when the number of output axle rotations (No) is smaller than the first setup value (50 rpm): the number of turbine rotations (Nt) is greater than the second setup value (10 rpm), but smaller than the third setup value (50 rpm); an engine idle is switched on; and the openness of the throttle valve is smaller than the fifth setup value (0.7V).

On the contrary, if the number of output axle rotations (No) is greater than the first setup value (50 rpm), but smaller than the fourth setup value (200 rpm) at the time of a R→D range switch of the shift lever, the switch state of an engine idle and the openness of the throttle valve are manipulated for satisfying all the first speed shifting conditions.

In other words, when the number of output axle rotations (No) is greater than the first setup value (50 rpm), but smaller than the fourth setup value (200 rpm), the conditions for the first speed shifting should be satisfied as follows: engine idle is switched on; the openness of the throttle valve is smaller than the fifth setup value (0.7V).

Figure 4:
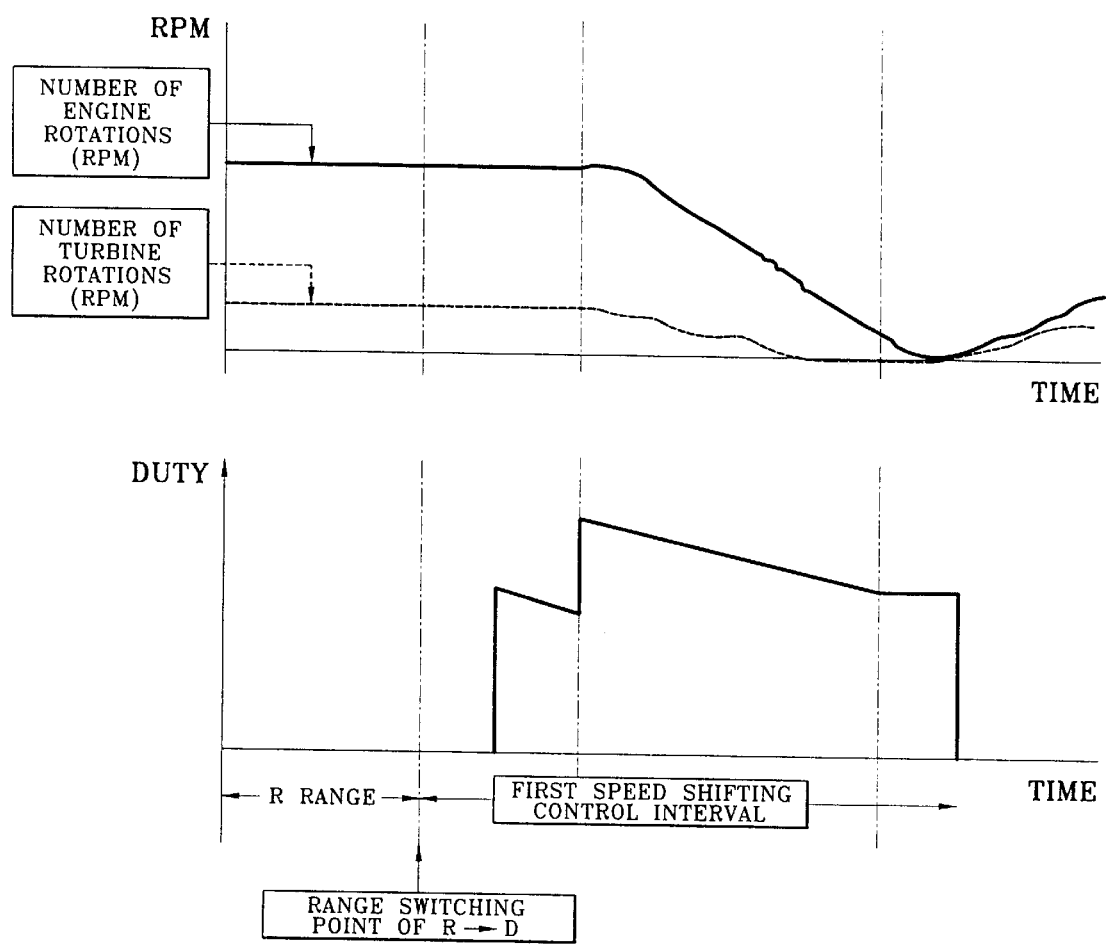
FIG. 4 is a shift controlling duty pattern diagram in accordance with the present invention.

Furthermore, if the first speed shifting conditions have been satisfied at the time of a R→D range switch of the shift lever, the shift control unit 200 outputs a predetermined duty control signal to the driving unit 300, as shown in FIG. 4, to perform the first speed shifting operations according to the preset program (S140).

The driving unit 300 is synchronized by a predetermined control signal output from the shift controlling unit 200 to relieve front clutch C2 and low reverse brake C3 functioning as combination elements while a vehicle is running backwards and to gradually increase the oil pressure to control only the rear clutch C1 as a combination element, thereby preventing severe rolling that may be caused by a sudden change in the running speed of the vehicle.

Meanwhile, if the first speed shifting conditions have not been satisfied at the time of a R→D range switch of the shift lever, the shift control unit 200 discriminates whether the second speed shifting conditions have been satisfied (S200).

The second speed shifting conditions at the time of a R→D range switch of the shift lever are as follows: the number of output axle rotations (No) is greater than the fourth setup value (200 rpm), the engine idle is switched on, and the openness of the throttle valve is smaller than the fifth setup value (0.7V).

If the second speed shifting conditions at the time of a R→D range switch of the shift lever are determined to be satisfactory, the shift control unit 200 outputs a predetermined duty control signal to the driving unit 300 for performing the second speed shifting operations according to a preset program (S210).

The driving unit 300 is synchronized by a predetermined control signal output from the shift control unit 200 to release the front clutch C2 and the low reverse brake C3 that function as combination elements while the vehicle is running backwards, to fasten the kick down servo C5 with line pressure prior to the rear clutch C1 and to gradually increase the rear clutch C1, thereby finishing combination.

However, if the second speed shifting conditions have not been satisfied at the time of a R→D range switch of the shift lever, the shift control unit 200 returns to its main routine.

Likewise, if the shifting operations are determined in considering brake pedal manipulation, engine idle and vehicle's backward running speed at the time of a R→D range switch of the shift lever while the vehicle is running backwards, it becomes possible to prevent shift shock and reduction in strength that may be caused by wear or loss of friction elements.

As described above, there is an advantage in the method for controlling shifts of an auto vehicle transmission of the present invention in that, if a range switch of the shift lever is made according to a backward running vehicle drivers intention to run forwards, the forward running shift is determined and then the forward running process is performed in considering brake pedal manipulation, the engine idle and vehicle's backward running speed at the time of a R→D range switch of the shift lever, thereby preventing the changing shift shock and reduction in strength that may be caused by wear or loss of friction elements.

What is claimed is:

1. A method for controlling shifts of an auto vehicle transmission, the method comprising the steps of:
   detecting whether a R→D range switch signal has been input while the vehicle is running backwards;
   detecting a vehicle's running state if said R→D range switch signal has been input;
   detecting whether a first speed shifting conditions are satisfied when said detected running states of the vehicle have been determined as follows: a brake switch is turned off, and a running speed is greater than 0 Kph; and performing a first shifting process if all said first speed shifting conditions have been fully satisfied.

2. The method, as defined in claim 1, further comprising a step of changing to a second shift stage if a vehicle's running conditions have been determined as follows: a brake switch is turned on; and a vehicle's running speed is 0 Kph.

3. The method, as defined in claim 1, wherein a first speed shifting conditions are discriminated to be satisfactory by using a number of turbine rotations when a number of output axle rotations is smaller than a first setup value at the time of a R→D range switch.

4. The method, as defined in claim 3, wherein, when the number of output axle rotations is smaller than a first setup value at the time of a R→D range switch, the first speed shifting condition is determined to be satisfactory if the number of turbine rotations is greater than a second setup value, but smaller than a third setup value, and if the engine idle is switched on and if the openness of a throttle valve is smaller than a fifth setup value.

5. The method, as defined in claim 4, wherein the second setup value is 10 rpm and the third setup value is 50 rpm.

6. The method, as defined in claim 1, wherein, when a number of output axle rotations is greater than a first setup value, but smaller than a fourth setup value at the time of a R→D range switch, the state of an engine idle switch and the openness of the throttle valve are used for discriminating whether the first speed shifting conditions are satisfactory.

7. The method, as defined in claim 6, wherein, when a number of output axle rotations is greater than the first setup value, but smaller than the fourth setup value at the time of a R→D range switch, the first speed shifting conditions are determined to be satisfactory if the engine idle is switched on and if the openness of the throttle valve is smaller than a fifth setup value.

8. The method, as defined in any one of claims 3 through 7, wherein the first setup value is 50 rpm.

9. The method, as defined in claim 1, further comprising a step of discriminating whether a second speed shifting conditions are satisfactory if the first speed shifting conditions are not satisfactory.

10. The method, as defined in claim 9, wherein the second speed shifting conditions are all determined to be satisfactory if the number of output axle rotations is greater than a fourth setup value, if the engine idle is switched on, and the openness of the throttle valve is smaller than a fifth setup value.

11. The method, as defined in claim 9, further comprising a step of performing a second speed shifting process if the second speed shifting conditions are determined to be satisfactory at the time of a R→D range switch.

12. The method, as defined in any one of claims 6, 7 or 10, wherein the fourth setup value is 200 rpm.

13. The method, as defined in any one of claims 4, 5, 7 or 10, wherein the fifth setup value is 0.7V.

\* \* \* \* \*